United States Patent [19]
Wallman et al.

[11] 3,906,799
[45] Sept. 23, 1975

[54] PRESSURE RESPONSIVE MEASURING INSTRUMENTS

[75] Inventors: Irwin Wallman, Briarcliff Manor; Erwin S. Rodger, Locust Valley, both of N.Y.

[73] Assignee: Consolidated Airborne Systems, Holtsville, N.Y.

[22] Filed: Jan. 6, 1975

[21] Appl. No.: 538,767

Related U.S. Application Data

[63] Continuation-in-part of Ser. No. 449,848, March 11, 1974.

[52] U.S. Cl. .................. 73/398 C; 73/393; 73/410; 317/246
[51] Int. Cl.² .......................................... G01L 9/12
[58] Field of Search.......... 73/398 C, 393, 410, 386, 73/387; 317/246; 318/645, 628

[56] References Cited
UNITED STATES PATENTS

| | | | |
|---|---|---|---|
| 2,178,027 | 10/1939 | Wright et al. | 73/387 |
| 3,141,334 | 7/1964 | Hastings | 73/410 |
| 3,777,570 | 12/1973 | Thomas et al. | 73/398 C |

Primary Examiner—Donald O. Woodiel
Attorney, Agent, or Firm—Leonard H. King

[57] ABSTRACT

Improvements for compensating for the hysteresis effects in a pressure responsive instrument is provided. Within the housing of the instrument there is a bellows the interior of which is adapted to be selectively placed in fluid communication with a source of pressure. A pair of upper and lower capacitor plates are mounted in the housing and the lower capacitor plate is secured to one end of the bellows. The upper capacitor plate is pivotally mounted on the lower capacitor plate. A function generating cam that drives a cam follower which is resiliently secured to the upper capacitor plate is used for changing the relative positions of the upper and lower capacitor plates. Resilient means are provided for adjusting the position of the upper capacitor plate relative to the lower capacitor plate to thereby compensate for the effects of hysteresis.

14 Claims, 11 Drawing Figures

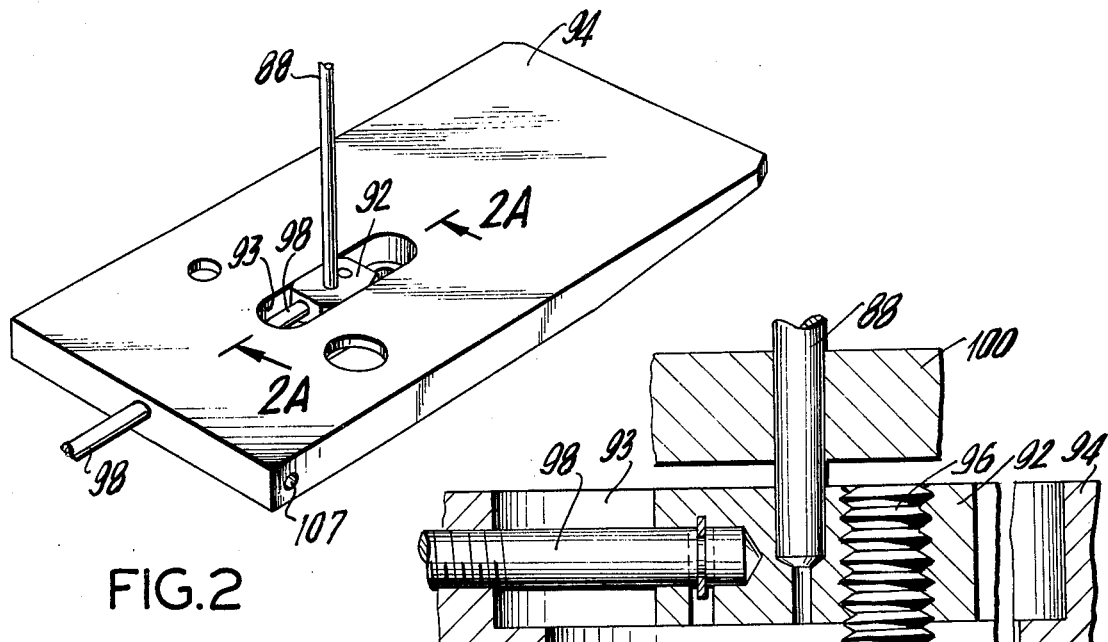
FIG.2
FIG.2A
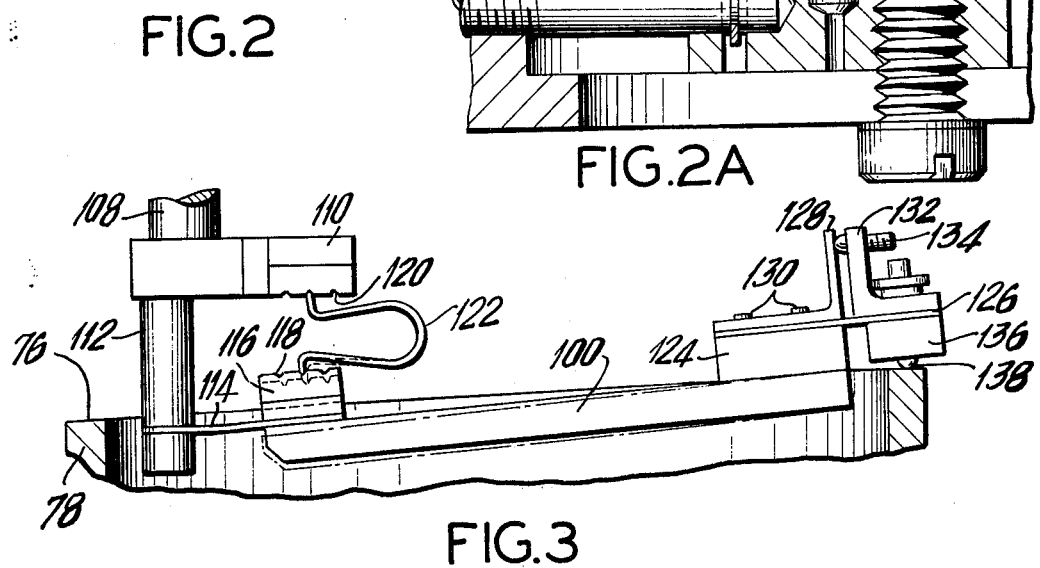
FIG.3
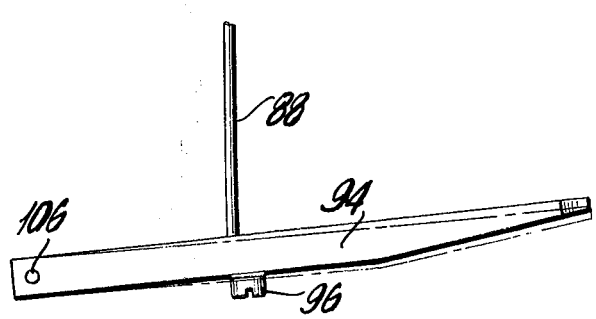
FIG.4

PRESSURE RESPONSIVE MEASURING INSTRUMENTS

This Application is a continuation-in-part of copending Application Ser. No. 449,848 filed Mar. 11, 1974.

The aforementioned abstract is neither intended to define the invention of the application which, of course, is measured by the claims, nor is it intended to be limiting as to the scope of the invention in any way.

BACKGROUND OF THE INVENTION

1. Field of the Invention

This invention relates generally to pressure responsive measuring instruments and more particularly to means for measuring the expansion of a bellows wherein compensation for mechanical hysteresis of the bellows is provided, by connecting a compensating spring between an externally driven plate and a fixed point.

2. Description of the Prior Art

The effects of mechanical hysteresis of the bellows is well known and many attempts have been made to compensate therefore in a pressure responsive measuring instrument. The most obvious approach is disclosed in U.S. Pat. No. 2,534,123 wherein an attempt is made to closely control the spring constant of the bellows in order to limit the hysteresis effect. More specifically, in U.S. Pat. Nos. 3,141,334 and 2,178,027 there are disclosures of means for avoiding hysteresis in pressure detecting instruments having bellows. In U.S. Pat. No. 3,141,334, the bellows are driven by engine oil pressure and are biased by a lever which is controlled by an arm that has accurately controlled linearity. A Torque rod is retained in position and prevented from turning with respect to a frame. Thus, the rod serves to spring bias the lever towards a zero position. In U.S. Pat. No. 2,178,027, an aneroid capsule is provided with a restoring spring. However, in this last mentioned patent the instrument has only a very small range so that hysteresis is negligible.

SUMMARY OF THE INVENTION

By way of contrast the present invention provides a fluid-tight housing in which is positioned a bellows that is adapted to have the interior thereof selectively placed in fluid communication with a source of pressure. A pair of upper and lower capacitor plates are coupled to each other and the lower capacitor plate is secured to one end of the bellows. A function generator in the form of a cup-shaped cam having a magnetic, peripheral cam surface is provided for moving the position of the upper plate relative to the lower plate. A U-shaped spring that is adjustably secured to the upper capacitor plate and to a fixed portion of the housing permits adjustment of the position of the upper capacitor plate relative to the position of the lower capacitor plate to thereby compensate for the effects of hysteresis.

Accordingly, it is an object of the present invention to provide improved means for compensating for the hysteresis effects of a bellows in a pressure responsive measuring instrument.

Other objects, features and advantages of the invention will, in part, be pointed out with particularity, and will, in part, become obvious from the following more detailed description of the invention, taken in conjunction with the accompanying drawing, which forms an integral part thereof.

BRIEF DESCRIPTION OF THE DRAWING

In the various figures of the drawing like reference characters designate like parts. In the drawing:

FIG. 2 is a perspective view illustrating the mounting arrangement for one of the components in the pressure sensor shown in FIG. 1;

FIG. 2a is a fragmentary sectional view taken along line 2a of FIG. 2;

FIG. 3 is a fragmentary elevational view illustrating the hysteresis effect on one of the components of the present invention, in two different positions;

FIG. 4 is a fragmentary elevational view illustrating the hysteresis effects in two positions of another component comprising the present invention;

DESCRIPTION OF THE PREFERRED EMBODIMENT

Figure 1:
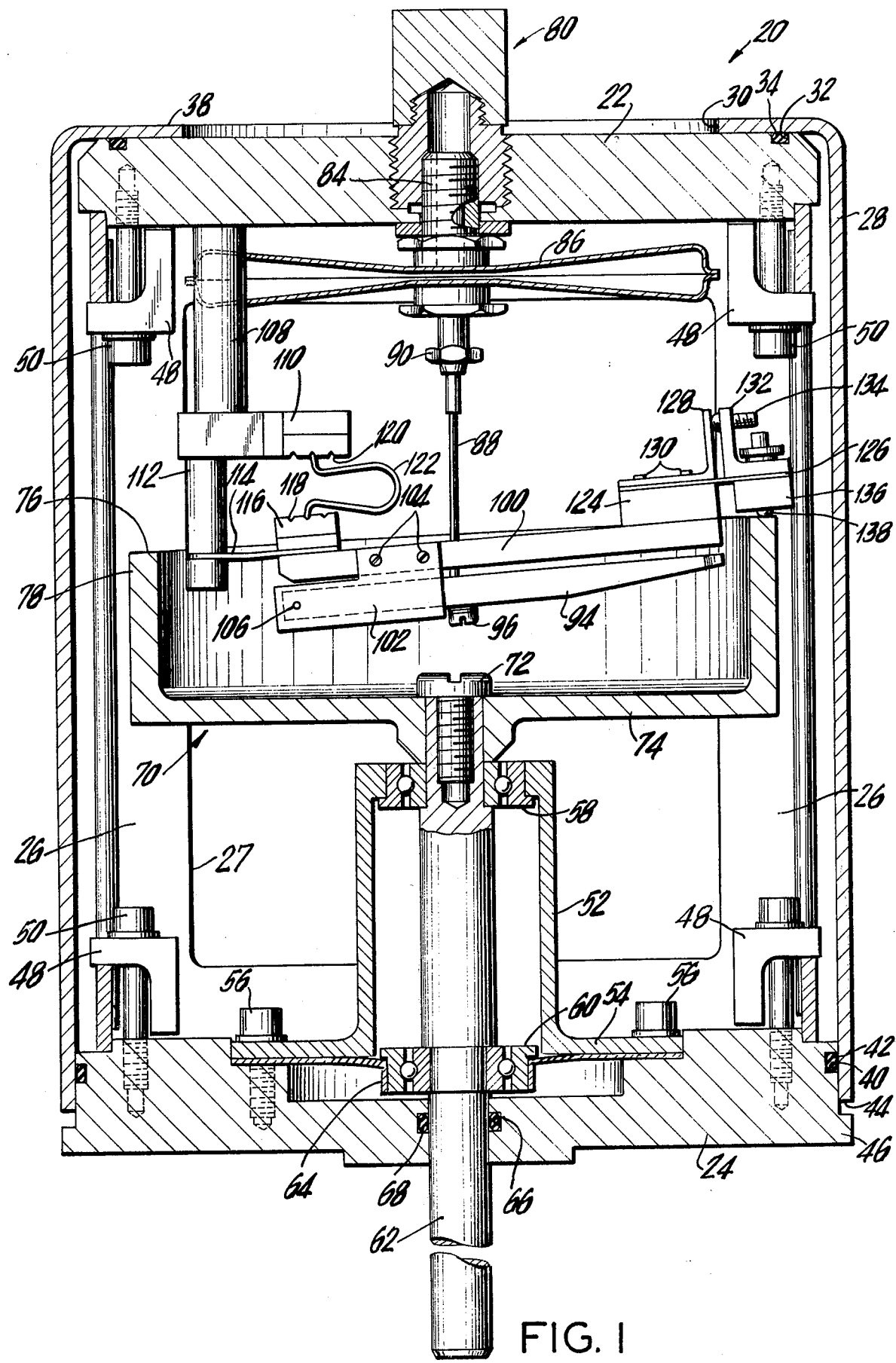
FIG. 1 is a longitudinal sectional view illustrating a pressure sensor comprising the present invention.

The structure of the pressure sensor 20 comprising the present invention may best be seen in FIG. 1. There are provided upper and lower end plates 22 and 24 which are accurately spaced apart by means of an inner cylinder with openings for access and clamping. An inverted, cup-shaped housing 28, having a central opening 30 at one end thereof, surrounds the end plates 22 and 24 as well as the spacer cylinder 26 having windows 27 formed therein. An annular groove 32 is formed in the upper surface of the upper end plate 22 in order to receive an O-ring 34 and an inwardly extending, radial lip 38 that defines the transverse end wall portion of the housing 28 captures the O-ring 34.

At the lower end of the pressure sensor 20 the end plate 24 is provided with an annular groove 40 on the periphery thereof for receiving a second O-ring 42. The lower open end of the housing 28 captures the O-ring 42. As shown in FIG. 1, there is an axially extending space 44 between the lower, open end of the housing 28 and a flange 46 that is formed integrally with the end plate 24 so as to define a synchro mounting.

For ease of assembly and disassembly there is also provided a plurality of generally L-shaped clamps 48. One leg of each of the clamps 48 engages the end of an access window in a cylinder 26 while the other leg of two of the clamps 48 engage the underside surface of the upper end plate 22. The other leg of the two remaining clamps 48 engage the upper surface of the lower end plate 24. Screws 50 secure the clamps 48 to the upper and lower end plates 22 and 24.

An elongated, cup-shaped support member 52 having a radially extending flange 54 at the lower, open end thereof is secured to the lower end plate 24 by means of screws 56. Axially spaced apart upper and lower bearings 58 and 60 that are retained within the support member 52 are used for journaling a shaft 62 that extends through the lower end plate 24. A spring member 64 that is also secured to the lower end plate 24 by means of the screws 56 is used for loading the lower bearing 60 so as to eliminate radial and end play in the shaft 62. An internal annular groove 66 is also formed within an axial bore in the end plate 24 in order to receive an O-ring that surrounds the shaft 62.

Function generating means in the form of a cup-like cam generally designated by the reference character 70 is secured to the inner end of the shaft 62 by means of a screw 72 that extends through a transverse wall 74 of the cam 70. A cam surface 76 is defined by the peripheral rim that is formed on the upper end of an annular wall 78 of the cam 70.

A male fitting, generally designated by the reference character 80 is secured to the upper end plate 22. A hollow, threaded post 84 is mounted in the fitting 80 in order to support a capsule or bellows 86. A flexible linkage 88 is coupled to the bellows 86 and is clamped thereto by means of a nut 90 which, as will be explained more fully hereinafter, provides rough adjustment means for zeroing purposes. The opposite, lower end of the flexible linkage 88 is secured, as shown best in FIG. 2, to an adjustable slide 92 that is mounted within an elongated slot 93 in a lower plate 94, by means of a screw 96. As will be described hereinafter an adjustment screw 98 extends through the lower plate 94 and is secured to the slide 92 by means of a snap ring 99.

Where absolute pressure is to be measured by the sensor 20 comprising this invention, the nut 80 is used for securing the capsule or bellows 86 as shown in FIG. 1. When differential pressure is to be measured, the nut 80 or male fitting is removed to provide for a pressure connection to the inside of the capsule or bellows 86 through the hollow threaded post 84.

An upper plate 100 has a spring plate 102 secured thereto by means of screws 104. Jewel bearing 106, mounted in opposed openings 107 in opposite sides of the lower plate 94 and the spring plate 102, provide means for pivotally mounting the upper plate 100 with respect to the lower plate 94.

A post 108 is rigidly secured to the underside of the upper end plate 22 and is provided with a bracket 110 at the lower end thereof. A second post 112 extends from the bracket 110 and supports one end of a flexure spring 114. The other end of the flexure spring 114 is secured to the upper plate 100 by means of a block 116 having a plurality of notches 118 formed therein. The bracket 110 is similarly provided with a plurality of notches 120 so that the ends of a U-shaped hysteresis compensation spring 122 may be adjustably captured therein.

The other end of the upper plate 100 is provided with a mounting bracket 124 having a resilient extension 126 made of berylium copper, for example, and an L-shaped bracket 128 secured thereto by means of screws 130. A second L-shaped bracket 132 is secured to the free end of the extension 126. One leg of the second bracket 132 is provided with a zero adjustment screw 134 whose function will be described hereinafter. The other leg of the second L-shaped bracket 132 supports a magnet 136 that is arranged to maintain a cam follower 138 in engagement with the cam surface 76 formed on the wall 78 of the cam 70.

The effects of hysteresis on the upper plate 100 are generated by the spring 122 so that the net hysteresis on the sensor 20 are cancelled. This may best be seen in FIG. 3. As shown, there are two positions of the upper plate 100 due to the hysteresis effect for a specific position of the cam. The solid outline indicates the position of the upper plate 100 after it has been raised by the cam 70 while the dot-and-dash outline indicates the position of the upper plate 100 after it has been lowered by the cam 70. It will be appreciated that the flexure pivot spring 114 serves two purposes. First of all, the flexure pivot permits pivoting of the upper plate 100. Second, the flexure pivot 114 provides a means for sensing variation in the spring pressure of the hysteresis spring 122.

The effect of hysteresis which result from the characteristics of the bellows 86 on the lower plate 94 are similarly shown in FIG. 4. The left side of the plate 94, as viewed in FIG. 1, is pivoted relative to the upper plate 100 on the jewel bearings 106. The position of the lower plate 94 is shown in solid outline after the capsule or bellows 86 has been compressed under the influence of the external pressure. The dot-and-dash outline of the lower plate 94 indicates its position after the bellows 86 has been expanded as a result of lower external pressure.

Figure 5A:
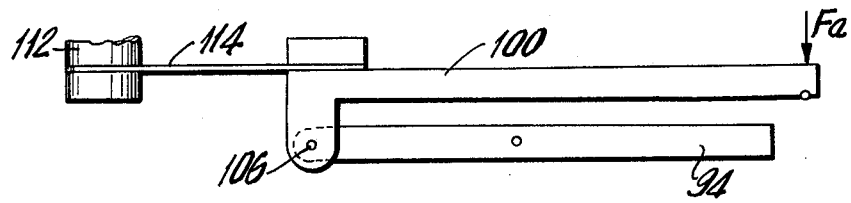
FIGS. 5A, 5B and 5C are schematic diagrams illustrating hysteresis compensation means for the structure shown in FIGS. 3 and 4.
Figure 5B:
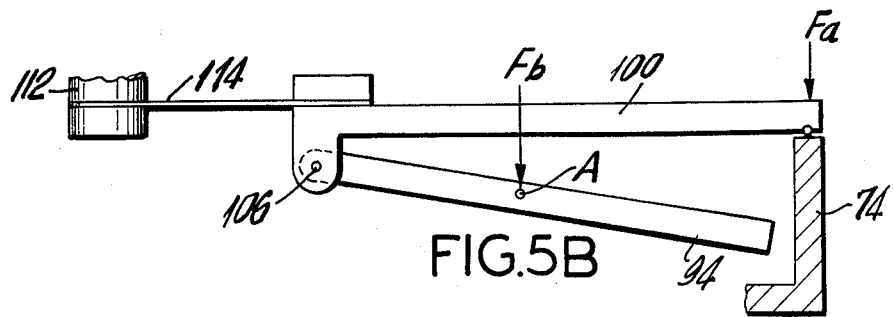
Figure 5C:
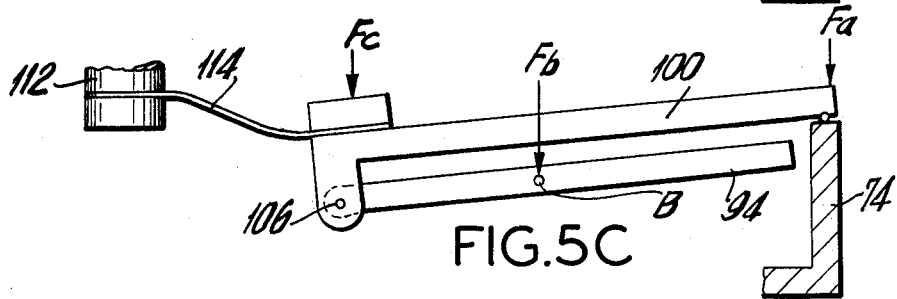

Turning now to FIGS. 5A, 5B and 5C, there is shown the means for providing compensation for hysteresis in the upper plate 100 and the lower plate 94. As shown in FIG. 5A both plates 100 and 94 are in the balanced position with no effects of hysteresis being applied to either member. The reference character Fa indicates the force of the magnet 136 holding the cam follower 138 against the cam surface 76. FIG. 5B can be interpreted to show the plates 94 and 100 at mid scale after returning from their fully deflected positions which result from full bellows extension.

The upper plate 100 is shown as it would appear under these conditions in the absence of hysteresis effects. The lower plate 94 is shown as the upper plate except depicting the exaggerated effect of bellows hysteresis. The fact that the plates are not parallel as in FIG. 5A introduces an error the magnitude of which is dependent on the magnitude of the bellows hysteresis. FIG. 5C shows the plates under the above conditions except depicting, in addition, the position of the upper plate 100 under the exaggerated effect of hysteresis generated by U-Spring 122. The action of the spring 122 which results in the configuration shown in FIG. 5C can be described as follows. Referring to FIG. 1 it can be seen that the lower plate 94 pivots down, resulting from the bellows expansion, and is followed down by the upper plate 100 as it pivots about Spring 114 and rides down the cam slope on follower 138. As this occurs the U-spring 122 expands until the plates are at their lowest level. When the plates return to mid-scale, for example, the spring 122 exerts more downward force ($F_c$ in FIG. 5C) on the upper plate 100 than it did previously due to its own hysteresis. This results in a downward displacement of the left end of the assembly of the plates 100 and 94, as in FIG. 5C. This results in a repositioning of the plates 100 and 94 which tends to bring them back into parallel alignment. It should be noted that point A in FIG. 5B is at the same level as point B in FIG. 5C.

This compensating action works in the same manner but in opposite directions when the plates 100 and 94 are coming from their full up positions resulting from maximum bellows compression. As can be seen, the vertical position of the left end of the plate assembly effects the output of the sensor. This position is partially determined by the relative stiffness of springs 114 and 122. It is desirable that the relative spring constants of the springs 114 and 122 be independent of temperature. This means that the thermoelastic coefficients of the two springs 114 and 122 should be the same (they need not be zero). In addition the spring 122 needs more hysteresis than the pivot spring 114. These requirements can be met by using beryllium copper for the pivot spring 114 and 18% nickel silver alloy for the spring 122.

Figure 6:
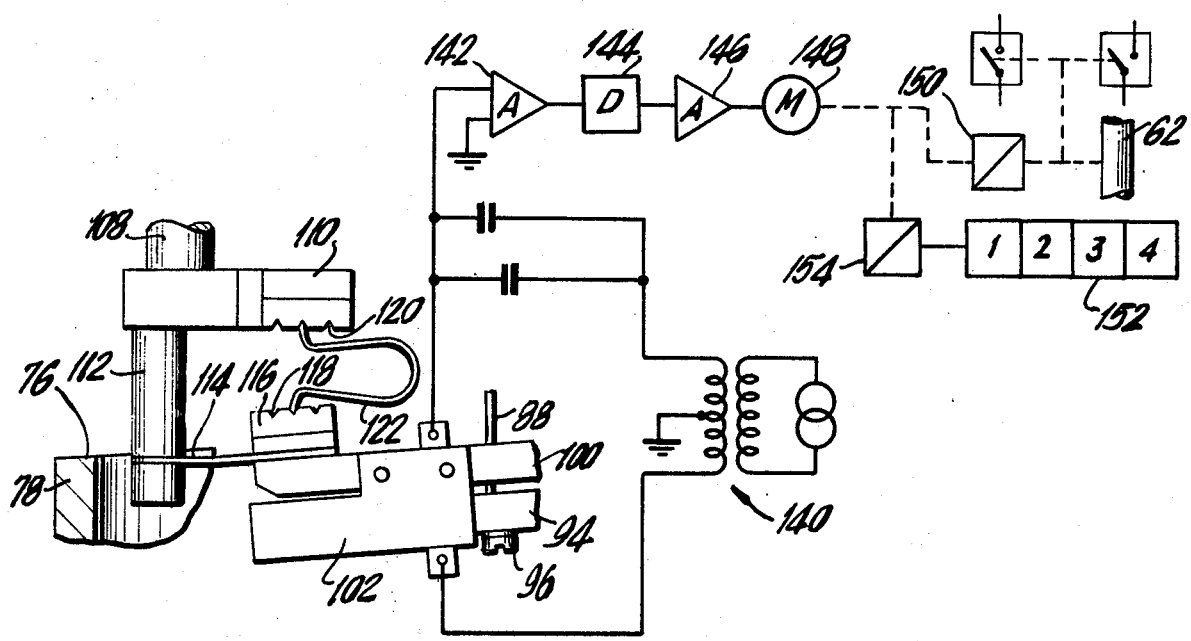
FIG. 6 is a fragmentary elevational view and schematic diagram illustrating the present invention in the pressure measuring mode.

The pressure measuring mode of the present invention is shown in FIG. 6 and will now be described in detail. In the pressure measuring mode, changes in pressure acting on the bellows 86 cause the lower plate 94 to move relative to the upper plate 100, thus causing a change in capacitance in the lower leg of a capacitance bridge 140. The unbalanced condition in the bridge 140 generates an error signal which is sensed by an amplifier 142, a demodulator 144 and a servo amplifier 146 that causes a motor 148 to turn in a direction that reduces the error signal. The motor 148 drives the cam 70 through a gear train 150 controlled by switches 151 and the shaft 62. The motor 148 also drives the cam 70 so that the upper plate 100 moves to a position parallel with the lower plate 94 to thereby balance the bridge 140 at which point the motor 148 stops rotating. A counter 152 which displays the position of the cam 70 in units of pressure, altitude, air speed or the like is coupled to the motor 158 by means of a gear train 154.

Figure 7:
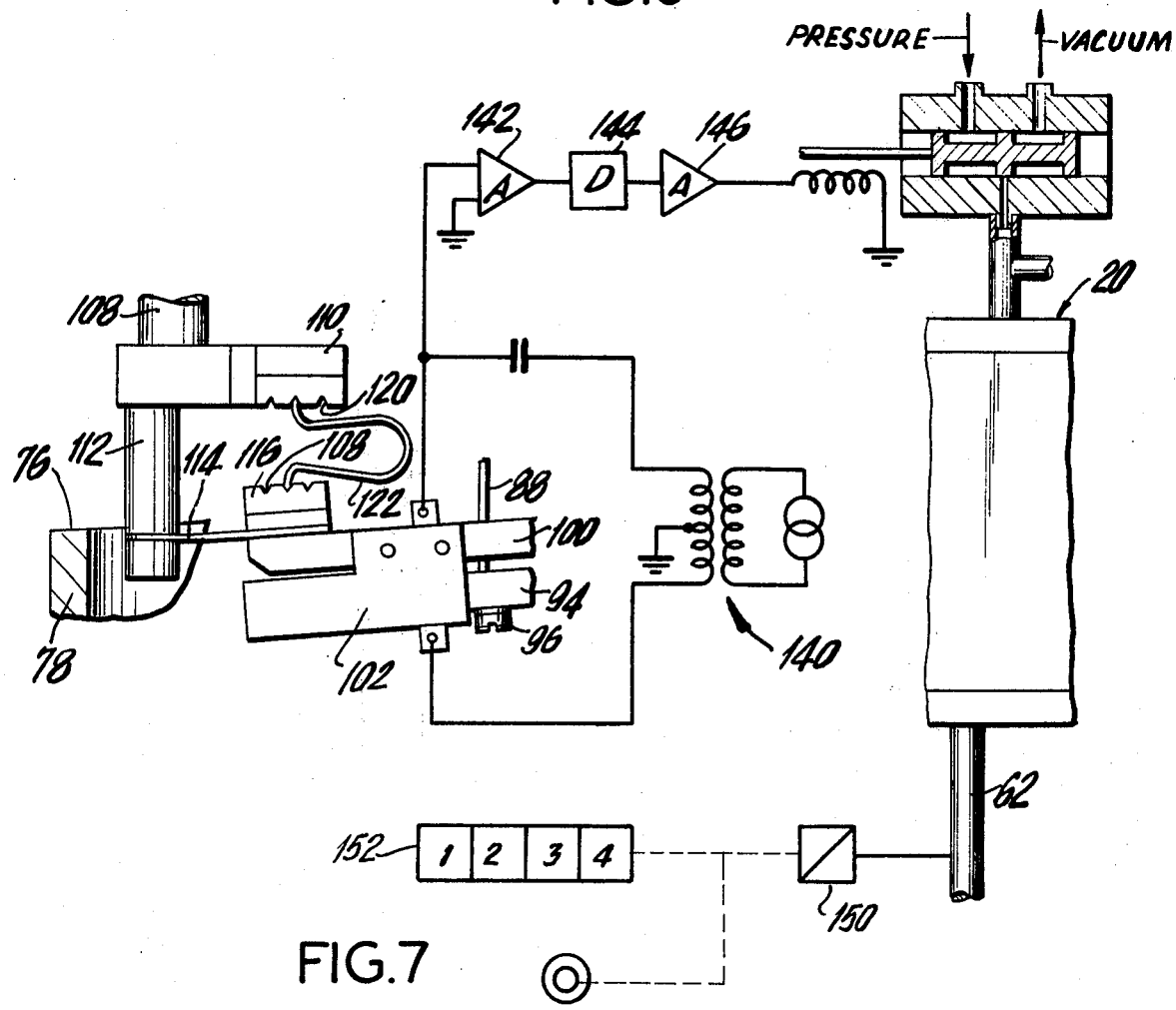
FIG. 7 is another fragmentary elevational view and schematic diagram illustrating the present invention in the pressure controlling mode.

In the pressure controlling mode, as shown in FIG. 7, the desired pressure is set into the cam 70 which causes the upper plate 100 to move as described above, and thereby balance the capacitance bridge 140. This causes an electrical signal to be applied to a servo valve 156 which, in turn, causes the pressure on the capsule or bellows 86 to either increase or decrease. The changes in pressure serve to move the lower plate 94 in such a manner as to balance the bridge 140 and when the bridge 140 is balanced the servo valve 156 returns to the neutral position.

Figure 8:
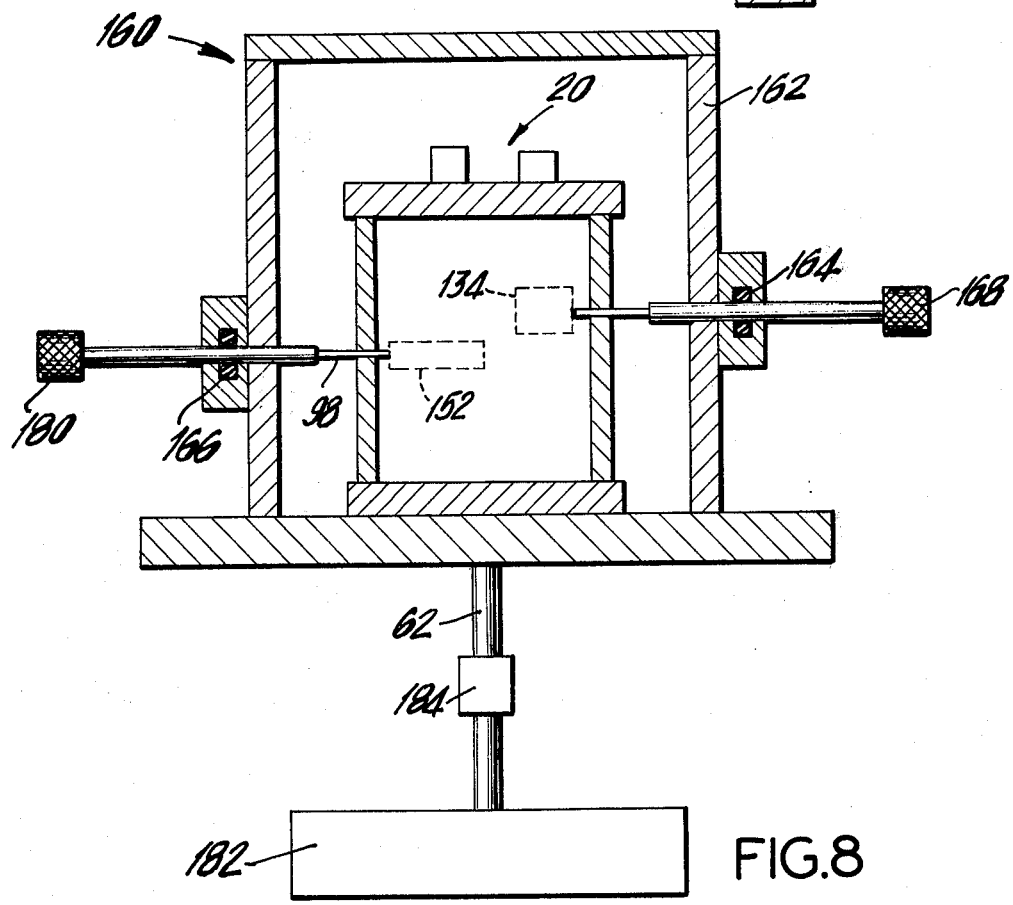
FIG. 8 is a schematic view illustrating structure for calibrating the sensor comprising the present invention.

A calibration fixture 160, with which the present invention may be used, is shown in FIG. 8. The fixture 160 includes a bell jar 162 having passages therethrough that are sealed by O-rings 164 and 166. Adjustment tools 168 and 180 for adjusting the zero mechanism and the scale mechanism are shown in FIG. 8. The shaft 62 of the pressure sensor 20 is driven by a rotary table 182 through a coupling 184.

There has been disclosed heretofore the best embodiment of the invention presently contemplated. However, it is to be understood that various changes and modifications may be made thereto without departing from the spirit of the invention.

What we claim as new and desire to secure by Letters Patent are:

1. A pressure responsive instrument comprising:
   a. a fluid-tight housing;
   b. an extendable bellows contained within said housing;
   c. a fitting for selectively placing the interior of said bellows in fluid communication with a source of pressure;
   d. upper and lower capacitor plates mounted in said housing;
   e. means for securing said lower capacitor plate to one end of said bellows;
   f. means for coupling said upper capacitor plate to said lower capacitor plate;
   g. function generating means for moving the position of said upper capacitor plate relative to said lower capacitor plate;
   h. first resilient means for adjusting the position of said upper capacitor plate relative to said lower capacitor plate to thereby compensate for the effects of hysteresis;
   i. second resilient means for coupling said upper capacitor plate to said function generating means; and
   j. means for driving said function generating means.

2. The instrument according to claim 1 wherein said fitting comprises a hollow post secured to said housing and in fluid communication with the interior of said bellows, said post further including a removable cap.

3. The instrument according to claim 1 wherein said securing means comprises an elongated flexible linkage having one end thereof secured to one end of said bellows, the other end of said linkage being secured to said lower capacitor plate.

4. The instrument according to claim 3 wherein there is further included means for axially displacing said linkage for providing rough adjustment of relative positions of said upper and said lower capacitor plates.

5. The instrument according to claim 3 wherein there is further included means for displacing said lower capacitor plate in a plane that is substantially parallel to the plane of said upper capacitor plate.

6. The instrument according to claim 1 wherein said coupling means comprises jewel bearing.

7. The instrument according to claim 6 wherein there is further included a U-shaped strap secured to said upper capacitor plate, said jewel bearing means extending through the legs of said U-shaped strap.

8. The instrument according to claim 1 wherein said function generating means is a cup-shaped cam having a peripheral, magnetic cam surface, said second resilient means being an elongated strip having one end thereof secured to said upper capacitor plate, the other end of said strip including a cam follower in the form of a magnet that is arranged to traverse said cam surface.

9. The instrument according to claim 8 further including means for adjusting said cam follower relative to said cam surface.

10. The instrument according to claim 1 wherein said first resilient means is a U-shaped spring having one leg thereof in engagement with said upper capacitor plate, the other leg of said U-shaped spring being in engagement with a fixed portion of said housing.

11. The instrument according to claim 10 further including means for adjusting the position of at least one said leg of said U-shaped spring.

12. The instrument according to claim 10 further including means for adjusting the position of both said legs of said U-shaped spring.

13. The instrument according to claim 1 including a third resilient means mounting said upper plate to a fixed frame which allows said upper plate to rotate in response to said function generating means and translate in response to first resilient means.

14. The instrument according to claim 1 including a third resilient means as in claim 13 which has essentially the same thermo-elastic coefficient as said first resilient means.

* * * * *